US006662234B2

United States Patent
Cheng

(10) Patent No.: US 6,662,234 B2
(45) Date of Patent: Dec. 9, 2003

(54) TRANSMITTING DATA FROM A HOST COMPUTER IN A REDUCED POWER STATE BY AN ISOLATION BLOCK THAT DISCONNECTS THE MEDIA ACCESS CONTROL LAYER FROM THE PHYSICAL LAYER

(75) Inventor: Shelley Cheng, Campbell, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 09/048,463

(22) Filed: Mar. 26, 1998

(65) Prior Publication Data

US 2001/0054116 A1 Dec. 20, 2001

(51) Int. Cl.[7] ................................................ B06F 15/16
(52) U.S. Cl. ...................................... 709/250; 709/223
(58) Field of Search ............................... 709/223, 224, 709/250; 340/825.06; 713/320, 323, 324; 370/463; 710/53

(56) References Cited

U.S. PATENT DOCUMENTS

| | | | | |
|---|---|---|---|---|
| 5,079,764 A | * | 1/1992 | Orita et al. | |
| 5,150,361 A | * | 9/1992 | Wieczorek et al. | |
| 5,210,749 A | | 5/1993 | Firoozmand | 370/85.1 |
| 5,444,856 A | * | 8/1995 | Bowers et al. | |
| 5,551,043 A | * | 8/1996 | Crump et al. | |
| 5,560,022 A | * | 9/1996 | Dunstan et al. | |
| 5,561,821 A | | 10/1996 | Gephardt et al. | 395/848 |
| 5,577,206 A | * | 11/1996 | Friedrich et al. | |
| 5,663,950 A | * | 9/1997 | Lee et al. | |
| 5,682,552 A | | 10/1997 | Kuboki et al. | 395/872 |
| 5,691,981 A | * | 11/1997 | Weiss | |
| 5,742,833 A | * | 4/1998 | Dea et al. | |
| 5,751,951 A | | 5/1998 | Osborne et al. | 395/200.8 |
| 5,757,773 A | * | 5/1998 | Tsuji | |
| 5,761,429 A | * | 6/1998 | Thompson | 709/224 |
| 5,787,084 A | | 7/1998 | Hoang et al. | 370/390 |
| 5,815,652 A | * | 9/1998 | Ote et al. | |
| 5,822,300 A | | 10/1998 | Johnson et al. | 370/229 |
| 5,826,068 A | * | 10/1998 | Gates | |
| 5,835,719 A | * | 11/1998 | Gibson et al. | |
| 5,905,867 A | * | 5/1999 | Giorgio | 709/224 |
| 5,915,119 A | * | 6/1999 | Cone | |
| 5,937,169 A | | 8/1999 | Connery et al. | 395/200.8 |
| 5,938,728 A | * | 8/1999 | Dwork | |
| 5,938,771 A | * | 8/1999 | Williams et al. | 713/323 |
| 5,940,771 A | * | 8/1999 | Gollnick et al. | |
| 5,949,974 A | * | 9/1999 | Ewing et al. | |
| 6,002,340 A | * | 12/1999 | Smith | 340/825.06 |
| 6,029,202 A | * | 2/2000 | Frazier et al. | |
| 6,065,073 A | * | 5/2000 | Booth | |
| 6,098,103 A | * | 8/2000 | Dreyer et al. | |

(List continued on next page.)

OTHER PUBLICATIONS

National Semiconductor CompactRISC™ 32–Bit Architecture; National Semiconductor Corporation; 1997.
Network PC System Design Guidelines; Compaq Computer Corporation et al.; pp. 1–152; Aug. 5, 1997.
82558 Fast Ethernet PCI Bus LAN Controller with Integrated PHY Product Brief; Intel Corporation; 4/97.
Implementation of Magic Packet™–Ready Motherboard; Advanced Micro Devices, Inc.; pp. 1–14; 4/97.
Glen Gibson; Magic Packet™ Technology; Advanced Micro Devices, Inc.; pp. 1–5; 11/95.

*Primary Examiner*—Le Hien Luu
*Assistant Examiner*—Stephan Willett
(74) *Attorney, Agent, or Firm*—Stallman & Pollock LLP

(57) ABSTRACT

A computer system controller monitors events. When a host processor enters a reduced-power state, the controller monitors network events, computer system events, and external events. The controller may respond to the events by transmitting frame data over the network. Before transmission, the frame data is stored in a memory.

6 Claims, 5 Drawing Sheets

U.S. PATENT DOCUMENTS

| | | | |
|---|---|---|---|
| 6,105,079 A | 8/2000 | Kuo et al. | 710/25 |
| 6,115,387 A | 9/2000 | Egbert et al. | 370/423 |
| 6,157,623 A | 12/2000 | Kerstein | 370/315 |
| 6,167,054 A | 12/2000 | Simmons et al. | 370/422 |
| 6,192,028 B1 | 2/2001 | Simmons et al. | 370/229 |
| 6,195,334 B1 | 2/2001 | Kadambi et al. | 370/236 |
| 6,215,816 B1 * | 4/2001 | Gillespie et al. | |
| 6,223,305 B1 | 4/2001 | Simmons et al. | 714/34 |
| 6,226,680 B1 | 5/2001 | Boucher et al. | 709/230 |
| 6,263,388 B1 * | 7/2001 | Cromer et al. | |
| 6,269,104 B1 * | 7/2001 | McLaughlin et al. | |
| 6,304,559 B1 * | 10/2001 | Jacklin et al. | |
| 2002/0071398 A1 * | 6/2002 | Moran et al. | |

\* cited by examiner

TRANSMITTING DATA FROM A HOST COMPUTER IN A REDUCED POWER STATE BY AN ISOLATION BLOCK THAT DISCONNECTS THE MEDIA ACCESS CONTROL LAYER FROM THE PHYSICAL LAYER

FIELD OF THE INVENTION

The invention relates generally to monitoring the system environment of an inactive networked computer, and more specifically to transmitting frame data in response to system events.

BACKGROUND OF THE INVENTION

Local Area Networks (LAN's) consist of a group of interconnected computers communicating according to a common protocol such as Ethernet (IEEE Standard 802.3). In a client-server type LAN, a server computer maintains files, which may be accessed by client computers. The server may also monitor and perform various maintenance functions on the client computer.

To save energy and reduce costs, client computers may enter a reduced-power (or sleep) state when they are not in active use. A sleep state shuts-down most components of a client computer and maintains only minimal functionality. Various techniques have been implemented to allow a server computer to wake-up a sleeping client computer. Generally these techniques require the sleeping computer to monitor network activity. Specific network events wake-up the sleeping computer.

Many network routers maintain a cache of active network computers. When a computer enters a sleep state it is no longer active on the network. Therefore, after a sufficient time, its address will age-out of the network router's cache. Upon receipt of a packet having an address not in its cache, the router will issue an address resolution protocol request (ARP).

The ARP is one network event, which should wake-up the sleeping computer. Upon entering an active state, the computer responds to the ARP and the network router continues to maintain the computer's address as an active network node.

Unfortunately, the wake-up time of the sleeping computer may exceed the time allowed to respond to the ARP. When this occurs, the router will drop the computer's address as an active network node. The router also will drop any subsequent packets addressed to that node.

In addition to monitoring network activity, a sleeping computer may monitor other events. For example, a sleeping computer may monitor system voltages. Upon detection of a change in status, such as an error condition, the sleeping computer may wake-up. The computer may then report the change in status over the network. The computer may then return to the sleep-state.

Few sleep-state monitoring systems include transmit capabilities, redundant to those of it's host computer, due to the expense associated therewith. The sleep-state monitoring systems rely upon the host computer to transmit change in status information. Unfortunately, an error condition may debilitate a sleeping computer. Thus, even though the monitoring system of a sleeping computer is able to detect an error condition, the sleeping computer may be unable to enter an active state to transmit the error condition over the network.

Few sleep-state monitors include an independent transmit system due to cost constraints and to the added complexity. For example, a typical transmit system requires logic to implement access to a first-in first-out buffer. Moreover, a typical transmit system implements direct memory access.

SUMMARY OF THE INVENTION

According to one aspect of the invention a network interface suitable for transmitting frame data over a network includes a media access control, a buffer manager and a memory. The media access control provides a connection to a media interface. The buffer manager is operationally coupled with the media access control. The memory is operationally coupled with the buffer manager. The buffer manager is configured to read frame data from the memory and provide the frame data to the media access control.

According to another aspect of the invention, a transmit buffer memory is configured to transmit a frame of data over a network. The transmit buffer memory receives frame data from a processor. The transmit buffer memory provides the frame data to a buffer manager only after an entire frame has been received.

According to another aspect of the invention a controller suitable for monitoring events related to a computer system includes a control processor, a plurality of connections, and a network interface. The control processor is configured to communicate with a host processor. The plurality of connections are operationally coupled with the control processor, and the controller processor is configured to monitor system events over the plurality of connections. The network interface is operationally coupled with the control processor and has a memory. The memory receives frame data from the control processor.

According to another aspect of the invention, a computer system has a network interface. The computer enters a reduced power state. The computer system monitors system events. The computer system writes a frame to a memory wherein the frame contains data relating to a system event while in the reduced power state. The computer system transmits the frame over a computer network while remaining in the reduced power state.

These and other objects, features and advantages will become apparent when considered with reference to the following description and the accompanying drawings.

DETAILED DESCRIPTION

Figure 1:
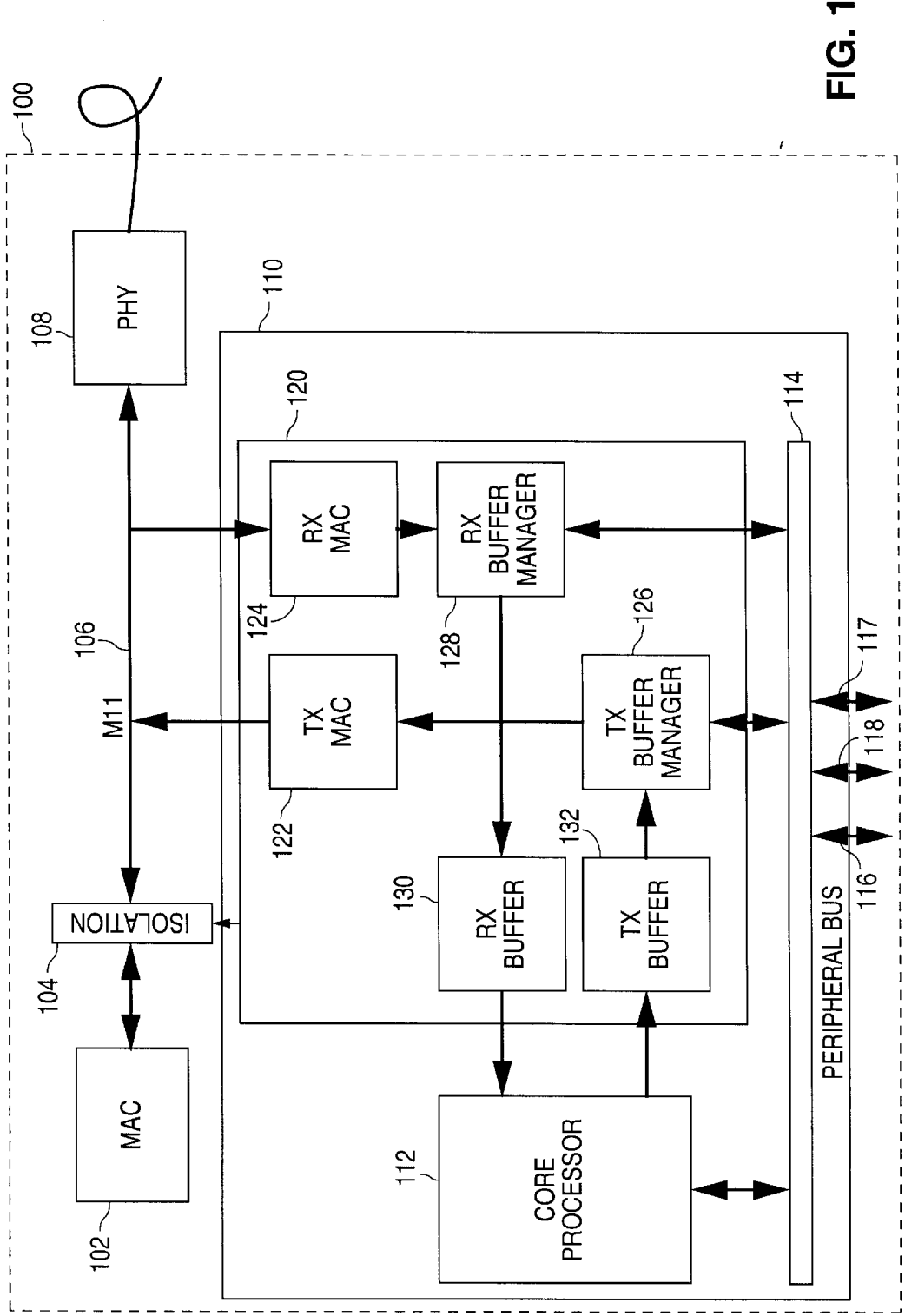
FIG. 1 is a block diagram of a system management controller according to the invention.

With reference to FIG. 1, a preferred embodiment of a system management controller 110 is described. The controller 110 is a chip mounted on the mother-board of a host computer 100. The controller 110 connects to a host computer via a host interface bus 116 (such as an Industry Standard Architecture bus) so that the host computer's processor is able to communicate with the controller 110. This interface allows the host computer 100 to issue commands to and share data with the controller 110.

The controller 110 also includes a number of external connections 118 to the host computer 100. These connections allow the controller 110 to monitor system environment parameters. For example the controller 110 is configured to monitor system voltages, fan speeds, temperatures, and other related parameters. In addition connections 118 are configured to monitor external events. For example the controller 110 provides connections to a telephone ring detection circuit, a chassis intrusion detection circuit, a power switch circuit, interrupt circuits, and other event circuits.

The host computer 100 is of the type having an interface to an external network. This interface includes a physical layer 108, which provides the connection to a network. The interface also includes a media access control (MAC) layer 102 connected to the physical layer 108 through the media independent interface (MII) 106. The MAC layer 102 interfaces with the host computer's operating system to allow the host computer to send and receive network data.

The controller 110 also includes a network interface 120. The network interface 120 includes a transmit MAC layer 122 and a receive MAC layer 124. The transmit MAC 122 and the receive MAC 124 comply with IEEE 802.3. These MAC layers interface the host computer's PHY layer 108 over the MII 106. When the host computer enters a sleep state, the controller 110 activates an isolation block 104. This disconnects the host computer's MAC layer 102 from the host computer's PHY layer 108, and enables the network interface 120 to transmit and receive data over an external network.

To transmit data, the network interface 120 reads data from the transmit buffer 132. More specifically, the buffer manager 126 reads the frame data from the transmit buffer 132. The transmit buffer manager 126 then provides the data to the transmit MAC 122. The transmit MAC 122 adds an appropriate preamble and start of frame delimiter to the data and provides it to the MII 106 for network transmission by the PHY layer 108. The transmit buffer manager 126 continues to read data from the transmit buffer 132 until its contents are empty. The buffer manager 126 continues to provide the data to the transmit MAC 122 for transmission over the network. The transmit MAC 122 also appends a frame check sequence at the end of a data packet.

Data received over the network is provided to the receive MAC 124 by the PHY layer 108 over the MII 106. The receive MAC 124 controls the receive operations during reception and loop-back.

Reception begins upon detection of the start of frame delimiter byte pattern. This activates a de-nibblizer circuit within the receive MAC 124, which packs the incoming four-bit-wide nibbles into sixteen-bit words.

The receive MAC ignores the rest of the preamble. The receive MAC 124 then begins transferring the destination portion of the incoming frame data to the receive buffer manager 128. At the same time, a receive filter circuit within the receive MAC 124 processes the destination address of the incoming packet. If the receive filter circuit determines that the packet should be accepted, the de-nibblizer passes the remainder of the packet to the receive buffer manager 128. The receive MAC 124 terminates reception when the carrier sense signal goes inactive.

After the reception of a complete packet, the receive MAC 124 performs error checking. Specifically, the receive MAC 124 checks for frame alignment errors, symbol errors, cyclic redundancy check errors, and length errors. If the packet fails any of these checks, the receive MAC 124 sets a flag to the receive buffer manager 128.

The controller 110 also includes a core processor 112. The core processor 112 may write data to the transmit buffer 132 or read data from the receive buffer 130. The core processor coordinates data transfers with the transmit and receive buffer managers, 126 and 128, over the peripheral bus 114.

In operation, the host computer's processor issues configuration commands to the controller 110. These commands instruct the controller 110 to monitor certain events such as environment parameters and external events. The controller 110 then monitors for the commanded events. When the host computer is in a sleep state, the events may be used to generate an interrupt signal. When the host computer is in an active state the events may be used to notify the host computer's processor of the event.

The commands from the host computer's processor may also instruct the controller 110 to monitor network activity, and to transmit data. When the host computer is in an active state, it controls the network interface (i.e. PHY layer 108). However, when the host computer enters a sleep state the controller 110 energizes the isolation block 104, and asserts control over the network interface.

Before entering a sleep state, the host computer's processor may command the controller 110 to monitor for specific events. For example, the controller 110 is programmable to monitor network activity for specific packets. The specific packets may contain the host computer's address in the destination address field, may have a unique bit pattern such as a MAGIC PACKET (i.e. a packet having sixteen repetitions of the destination address), or may otherwise contain an identifiable bit pattern.

The controller 110 is further programmable to take specific actions. The controller 110 may transmit packet data, issue a wake-up interrupt to the host computer's processor, or activate controller outputs 117.

Before entering a sleep state, the host computer's processor may command the controller 110 to perform specific actions upon the occurrence of specific events. For example, the controller 110 is programmable to automatically respond to address resolution protocol (ARP) or other packets. The controller 110 also is programmable to report other diagnostic information over the network. The diagnostic information includes system environment parameters and external events. Thus, the controller 110 is programmable to respond to diagnostic requests received over the network. The controller is also programmable to transmit diagnostic information upon the occurrence of other events.

Figure 2:
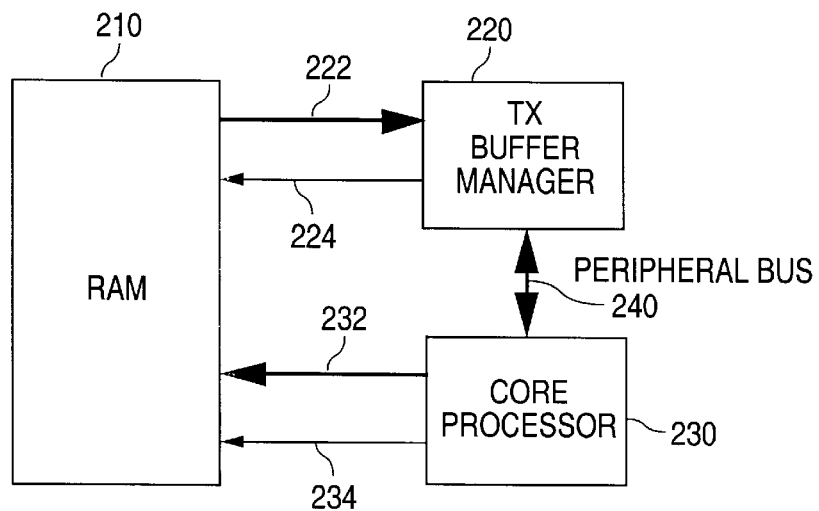
FIG. 2 is a block diagram showing a transmit buffer and transmit buffer manager according to the invention.

Turning to FIG. 2, a preferred embodiment of a transmit buffer will be described. The random access memory (RAM) 210 acts as the transmit buffer and is used to store data before transmission over the network. The core processor 230 requests access to the RAM 210 over control lines 234. The core processor then writes data to the RAM 210 over data bus 232. After writing data to the RAM 210, the core processor notifies the transmit manager 220 over peripheral bus 240. The transmit buffer manager 220 then requests access to the RAM 210 over control lines 224. The transmit buffer manager 220 then reads the contents of RAM 210 over data bus 222.

The RAM 210 is a single port RAM. As seen by the RAM 210, the busses 222 and 232 are a single bi-directional bus.

Figure 3A:
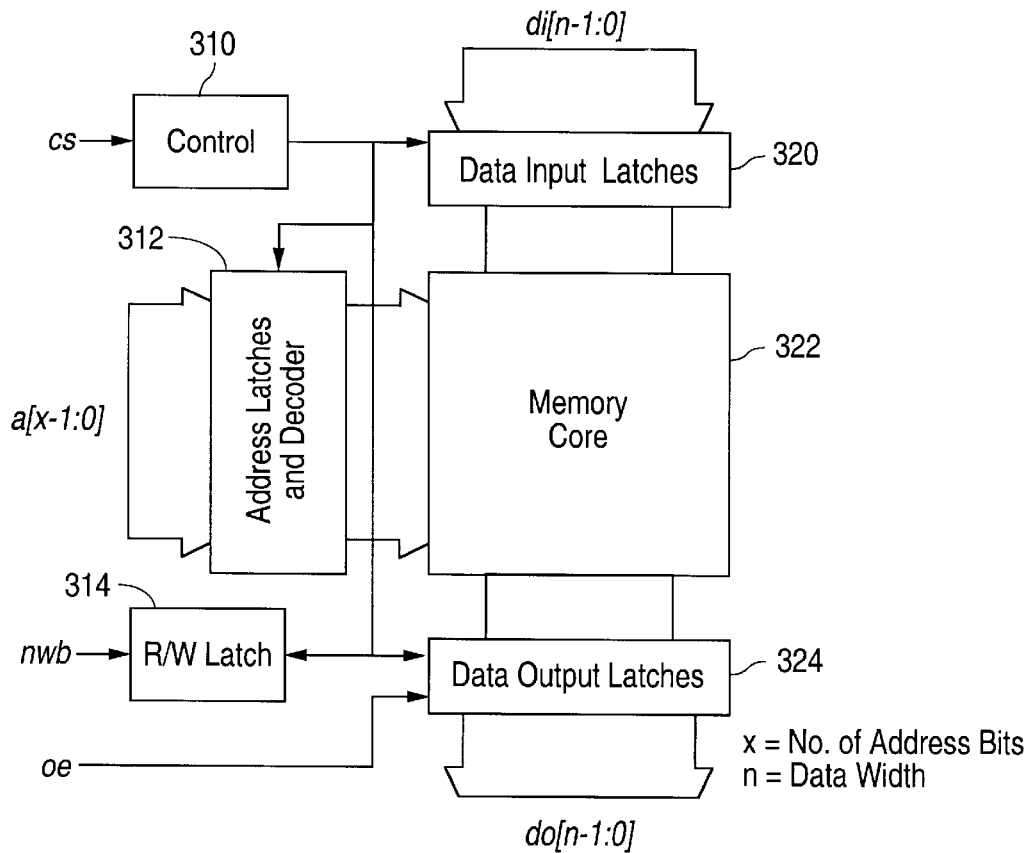
FIG. 3a is a block diagram showing a transmit buffer according to the invention.

Turning to FIG. 3a, a preferred embodiment of the transmit buffer will be described. Memory core 322 holds n bits of data at x address locations. To write data to the memory core 322, the R/W latch 314 must be placed in a low state by the read-write (rwb) signal. At the same time, write data is provided to data input latches 320 over a data input (di) bus, and a memory location is selected on the address latch 312 over an address (a) bus. A positive edge on the control (cs) signal causes the control block 310 to perform the latching of the read-write, data, and address signals. The cs signal then returns to a low state, and the data is written to the desired address location in the memory core 322. After a predetermined period of time, the memory is ready for another read or write operation.

To read data from the memory core 322, the R/W latch 314 must be placed in a high state by the rwb signal. At the same time, a memory location is selected on the address latch 312 over the address bus. A positive edge on the cs signal causes the control block to perform the latching of the read-write and address signals. The cs signal then returns to a low state, and after a predetermined period of time the contents of the memory core 322 at the selected address are provided by the data output latch 324 over an output (do) bus. The output (oe) enable signal allows control of the data output bus. After a predetermined period of time, the memory is ready for another read or write operation.

Figure 3B:
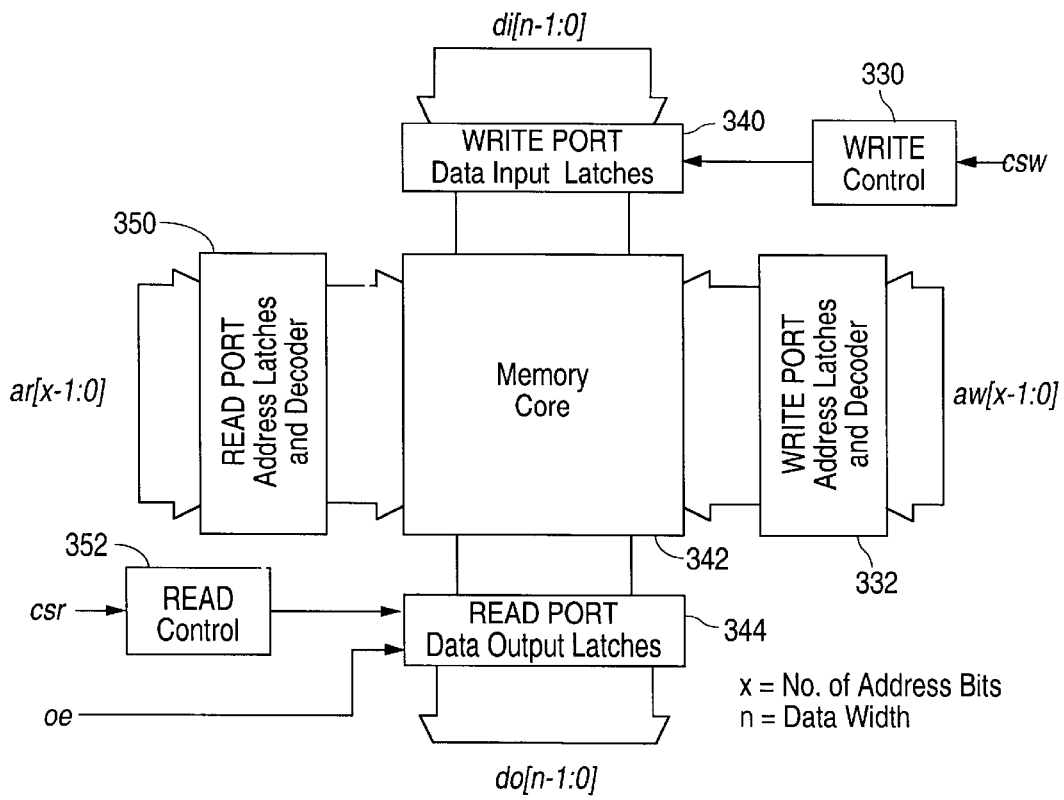
FIG. 3b is a block diagram showing another transmit buffer according to the invention.

Turning to FIG. 3b, another embodiment of the transmit buffer will be described. Memory core 822 holds n bits of data at x address locations. To write data to the memory core 342, the write control block 330 must be placed in a high state by the write (csw) signal. At the same time, write data is provided to data input latches 340 over a data input (di) bus, and a memory location is selected on the address latch 332 over an address (aw) bus. A positive edge on the csw signal causes the write control block 330 to perform the latching of the data, and address signals. The csw signal then returns to a low state, and the data is written to the desired address location in the memory core 342. After a predetermined period of time, the memory is ready for another write operation.

To read data from the memory core 342, the read control block 352 must be placed in a high state by the csr signal. At the same time, a memory location is selected on the address latch 350 over the address ar bus. A positive edge on the csr signal causes the read control block 352 to perform the latching of the address signal. The csr signal then returns to a low state, and after a predetermined period of time the contents of the memory core 352 at the selected address are provided by the data output latch 344 over an output (do) bus. The output enable (oe) signal allows control of the data output bus. After a predetermined period of time, the memory is ready for another read operation. The read and write operations may occur simultaneously.

Figure 4:
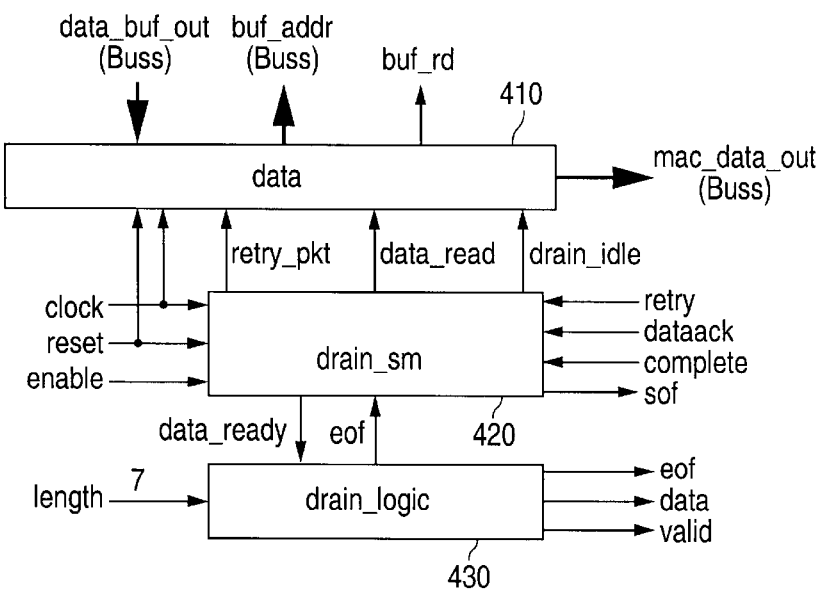
FIG. 4 is a block diagram of a transmit buffer manager according to the invention.

Turning to FIG. 4, a preferred embodiment of a transmit buffer manager is described. The transmit buffer manager includes a data block 410, a drain state machine (drain-sm) 420, and a drain logic circuit 430.

Generally, the drain state machine 420 coordinates the transfers from a buffer memory to the transmit MAC through the data block 410. The drain-logic circuit 430 generates signals indicating status relating to the transfer of data out of the data buffer.

More specifically, the state machine 420 receives clock, reset, and enable signals through a controller 110. The state machine 420 also receives retry, data acknowledge (dataack), and complete signals from a transmitter MAC 122. The state machine 420 further receives a transmit end-of-frame (eof) signal from the drain logic circuit 430. The state machine 420 uses these signals to generate retry-packet (retry-pkt), data-read, and transmit drain idle (drain-idle) signals, which are provided to the data block 410. The state machine 420 also generates a start-of-frame (sof) signal, which is provided to the transmit MAC.

The drain logic circuit 430 receives a length signal through the controller 110, and a data-ready signal from the drain state machine 420. The drain logic circuit 430 uses these signals to generate end-of-frame (eof), data, and valid signals, which are provided to the transmit MAC 122. The eof signal is also provided to the drain state machine 420.

The data block 410 receives the clock and the reset signals though the controller 110. In addition, the data block 410 receives the retry-pkt, data-read, and drain-idle signal from the drain state machine 420. In response, the data block 410 generates buffer address (buf-addr) and buffer read (buf-rd) signals, which are provided to a data buffer 132. The buff-addr signals are provided over a buff-addr bus. In response, the data buffer 132 provides the data held in the selected address through data buffer output (data-buf-out) signals over a data-buf-out bus. The data block 410 then provides these signals to the transmit MAC through MAC data output (mac-data-out) signals. The MAC-data-out signals are provided over a MAC-data-out bus.

Figure 5:
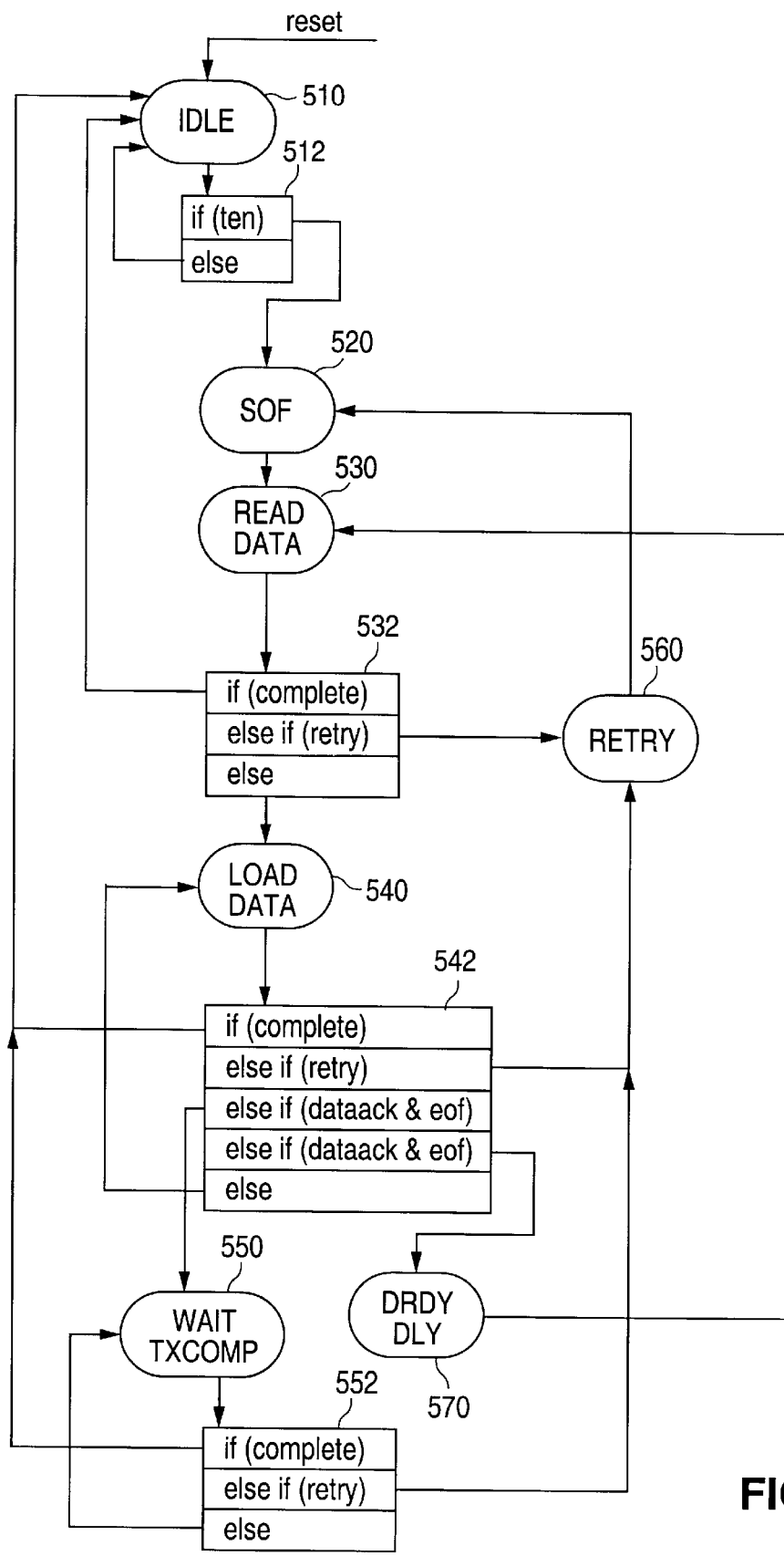
FIG. 5 is a flow chart showing the operation of a transmit buffer manager according to the invention.

Turning to FIG. 5, a preferred operation of the state machine of FIG. 4 will be described. The state machine enters an idle state 510 upon receipt of a reset signal. In the idle state 510, the state machine tests whether it has received an enable signal at block 512. If so, the state machine enters a start-of-frame (sof) state 520. If not, the state machine remains in the idle state 510.

At the sof state 520, the state machine generates the sof signal, which is provided to the transmit MAC. The state machine then enters a read data state 530. In this state, the state machine provides an address read signal to a data buffer and reads the contents of the data buffer at the address. The state machine then tests whether it has received a complete signal from the MAC. If so, the state machine returns to the idle state 510. If not, the state machine tests whether it has received a retry signal from the MAC. If so, the state machine proceeds to retry state 560. If not, the state machine proceeds to load data state 540.

In the load data state 540, the state machine provides the data it has just read from the data buffer to the transmit MAC. The state machine then proceeds to block 542 to test whether it has received a complete signal from the transmit MAC. If so, the state machine returns to idle state 510. If not, the state machine tests whether it has received a retry signal from the transmit MAC. If so, the state machine proceeds to the retry state 560. If not, the state machine tests the status of the dataack signal from the transmit MAC and the eof signal. If the state machine has received both of these signals, indicating the successful loading of an entire frame, the state machine proceeds to a wait transmit complete state 550.

If the state machine has received the dataack signal but not the eof signal, the state machine proceeds to data ready delay (drdy-dly) state 570. Otherwise, the state machine returns to load data state 540.

In the wait transmit complete state 550 the state machine determines whether it has received either a complete or retry signal from the transmit MAC. If it has received a complete signal, it returns to idle state 510. If it has received a retry signal it proceeds to the retry state 560. Otherwise, it remains in the wait transmit complete state 550.

In the data ready delay state 570, the state machine waits a predetermined period of time. The state machine then returns to read data state 530 to read the data at the next or sequential memory address in the data buffer.

Entry of the retry state 560 indicates that the data transfer has encountered an error. The state machine then resets counters and returns to the sof state 520 to reattempt the transmission.

Figure 6:
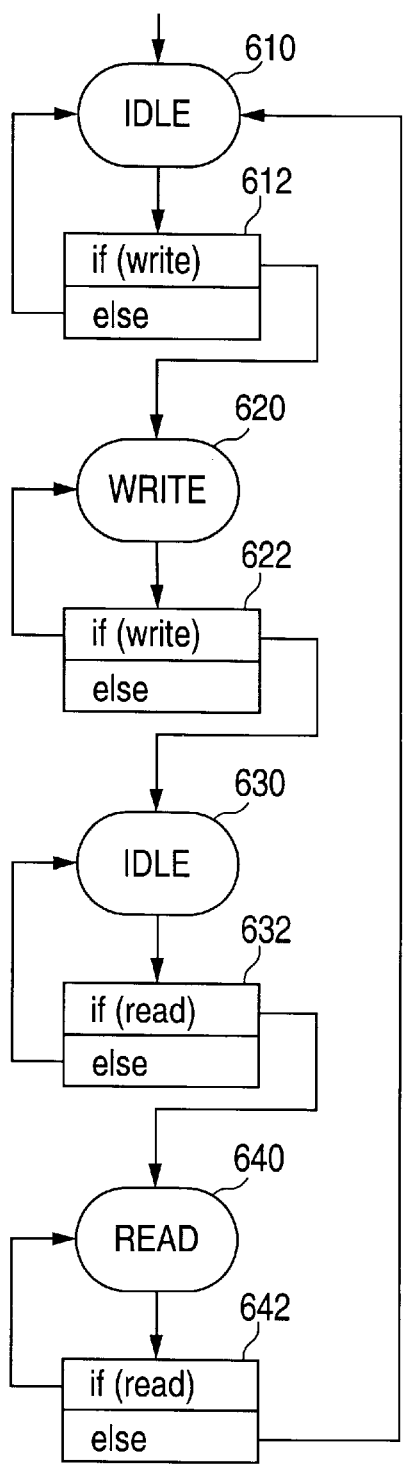
FIG. 6 is a flow chart showing the operation of a single port memory according to the invention.

Turning to FIG. 6, a preferred operation of a single port memory which may be used in conjunction with a transmit buffer manager and a controller processor is described. The memory begins at idle block 610. The memory tests for a write signal from the processor at block 612. If the memory receives this signal it proceeds to write block 620, otherwise it remains in idle block 610.

In write block 620, the memory receives a selected address from the processor over an address bus. In addition the memory receives data from the processor over a data bus. The memory stores the data at the selected address location. The memory again tests for the write signal from the controller at block 622. If the memory continues to receive this signal, it returns to write block 620, otherwise it proceeds to idle block 630. Upon completion of a write sequence, the processor notifies the buffer manager of completion and the size of the frame data.

The memory tests for a read signal from a transfer buffer manager at block 632. If the memory receives this signal it proceeds to read block 640, otherwise it remains in idle block 630.

In read block 640, the memory receives a selected address from the transmit buffer manager over an address bus. The memory reads data from the selected address, and provides the data to the transmit buffer manager over a data bus. The memory again tests for the read signal at block 642. If the memory continues to receive this signal, it returns to read block 640, otherwise it proceeds to idle block 610.

According to the above described operation, frame data written to the buffer memory will always be read before frame data for a subsequent frame is written. This operation, therefore, eliminates logic which would otherwise be required to implement first-in first-out management.

A controller, according to the invention, will access the transmitter to respond to network and system events with diagnostic-type data. For example, the diagnostic data might indicate system voltage levels, temperature levels, interrupt signals, a response to an ARP, or other events. Accordingly, the frame size required to transmit the data will be relatively small. The buffer memory is sized accordingly (e.g. 128 bytes).

Although the embodiments described herein are with reference to a transmit buffer and a transmit buffer manager having particular configurations, the present invention could be implemented with different modules having different configurations. Those skilled in the art will certainly understand from the embodiments discloses herein that many modifications are possible without departing from the teachings hereof. All such modifications are intended to be encompassed within the following claims.

I claim:

1. A computer system comprising:
   (a) a host computer;
   (b) an external network interface for connecting the host computer to an external computer network, the external network interface including:
      (i) a host computer physical layer that connects to the external computer network; and
      (ii) a host computer media access control layer connected to the host computer through a media independent interface;
   (c) an isolation block connected to the media independent interface between the host computer physical layer and the host computer media access control layer, and
   (d) a network interface controller system that includes:
      (i) a network interface media access control layer connected to the media independent interface;
      (ii) a network interface buffer manager coupled to the network interface media access control layer, and
      (iii) a network interface buffer memory coupled to the network interface buffer manager, the network interface buffer manager being configurable to transfer frame data between the network interface buffer memory and the media independent interface via the network interface media access control layer when the isolation block is activated; and
   wherein the isolation block is activated in response to the host computer entering a sleep state such that the host computer media access control layer is disconnected from the host computer physical layer and the network interface controller system is connected to the host computer physical layer to enable transfer of frame data between the network interface buffer memory and the external computer network.

2. The computer system of claim 1, and wherein the network interface media access control layer comprises:
   a network interface transmit media access control layer, and
   a network interface receive media access control layer.

3. The computer system of claim 1, and wherein the network interface buffer manager comprises:
   an address bus;
   a data bus; and
   a read signal line, and
   wherein the address bus, the data bus and the read signal line are each operationally coupled with the network interface buffer memory; and
   wherein the network interface buffer manager is configured to read data frames from the network interface buffer memory over the data bus by selecting an address on the address bus and activating the read signal line.

4. The computer system of claim 1, and wherein the network interface buffer manager comprises:
   a data module operationally coupled with the network interface buffer memory and the network interface media access control layer, wherein the data module is configured to select frame data from the network interface buffer memory and provides the frame data to the network interface media access control layer; and
   a state machine operationally coupled with the data module and the network interface media access control layer, wherein the state machine is configured to receive first command signals from the network interface media access control layer and generates second command signals to data module, and wherein the data module uses the second command signals to select the frame data.

5. A method of operating a computer system, comprising:
   (a) providing a host computer;
   (b) providing an external network interface for connecting the host computer to an external computer network, the external network interface including:
      (i) a host computer physical layer that connects to the external computer network; and (ii) a host computer media access control layer connected to the host computer through a media independent interface;

(c) providing an isolation block connected to the media independent interface between the host computer physical layer and the host computer media access control layer; and (d) providing a network interface controller system that includes:
   (i) a network interface media access control layer connected to the media independent interface;
   (ii) a network interface buffer manager coupled to the network interface media access control layer; and
   (iii) a network interface buffer memory coupled to the network interface buffer manager, the network interface buffer manager being configurable to transfer frame data between the network interface buffer memory and the media independent interface via the network interface media access control layer when the isolation block is activated;

(e) in response to the host computer entering a sleep state, activating the isolation block such that the host computer media access control layer is disconnected from the host computer physical layer and the network interface controller system is connected to the host computer physical layer; and (f) transferring frame data between the network interface buffet memory and the external computer network.

6. A method as in claim 5, and wherein the network interface buffer manager includes an address bus, a data bus, and a read signal line, each operationally coupled with the network interface buffer memory, and further comprising:

reading data frames from the network interface buffer memory by selecting an address on the address bus and activating the read signal line.

\* \* \* \* \*